(No Model.)
E. L. STREAM.
CENTRIFUGAL PUMP.
No. 387,264. Patented Aug. 7, 1888.
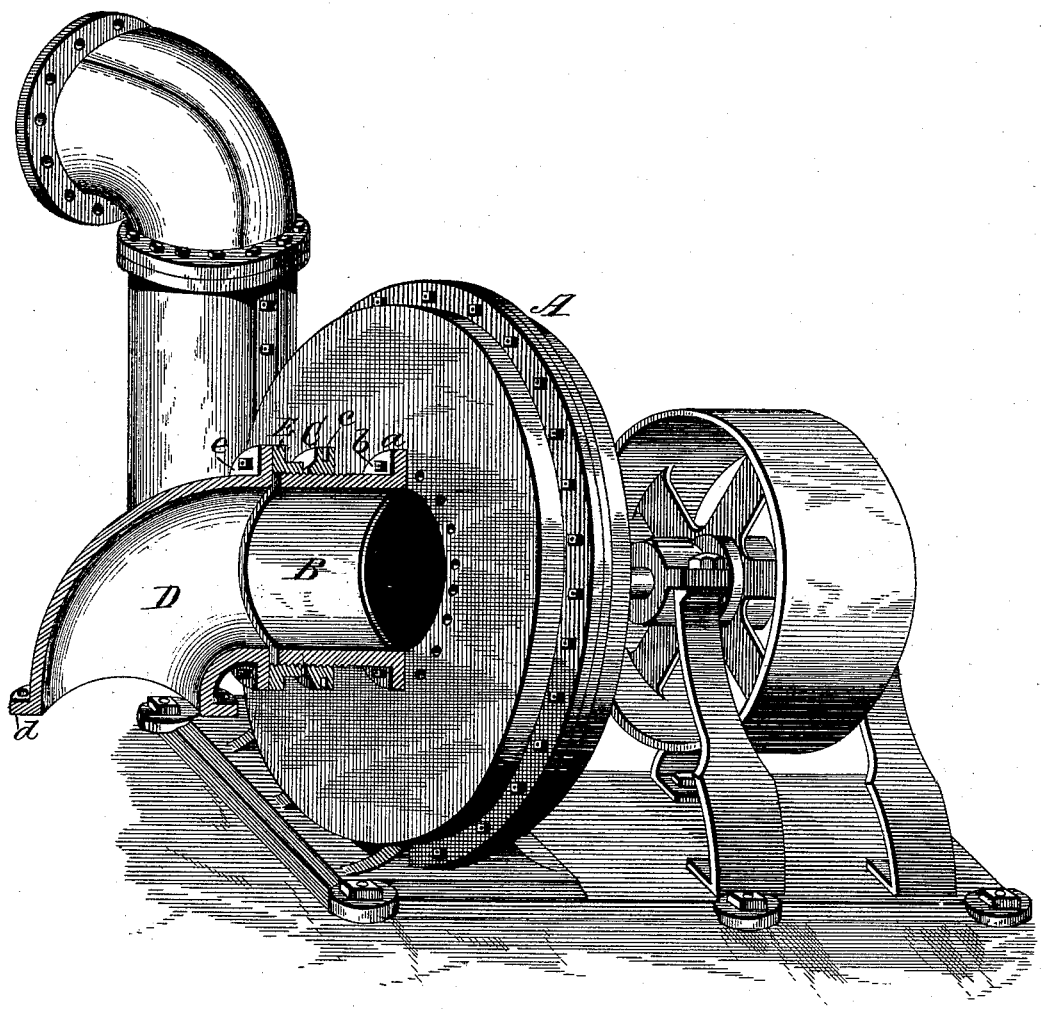
Witnesses,
Albert Spider
N. Clarence Moore
Inventor,
Edward L. Stream.
By his Attorney
Chas. N. Fowler

UNITED STATES PATENT OFFICE.

EDGAR LOUIS STREAM, OF NEW ORLEANS, LOUISIANA.

CENTRIFUGAL PUMP.

SPECIFICATION forming part of Letters Patent No. 387,264, dated August 7, 1888.

Application filed March 31, 1888. Serial No. 269,193. (No model.)

*To all whom it may concern:*

Be it known that I, EDGAR LOUIS STREAM, a citizen of the United States, residing at New Orleans, in the parish of Orleans and State of Louisiana, have invented certain new and useful Improvements in Centrifugal Pumps; and I do hereby declare that the following is a full, clear, and exact description of the same, reference being had to the annexed drawing, making a part of this specification, and to the letters of reference marked thereon.

The present invention has reference to that class of centrifugal pumps in which the suction pipe or elbow thereof is bolted to the side of the casing. Where the elbow is on the side of the casing, it is sometimes necessary to raise and lower the suction-pipe, which hangs on an angle, without taking off any of the pipe, which is usually accomplished by attaching a rope to the foot-valve and pulling it up, and when the bolts have to be taken out it requires the assistance of several laborers to hold the pipe in place, and then it can only be moved to the next bolt-hole.

It is the object of the present invention to remedy these difficulties and the labor necessary to adjust said suction-pipe; and it therefore consists in the particular manner of attaching the elbow of the suction-pipe to the side of the pump-casing, whereby it can be readily and quickly adjusted to change its height as circumstances require, as will be hereinafter described and claimed.

I have shown in the drawing a perspective view of a centrifugal pump with my improvement in section to more clearly show its construction, the casing of the pump being shown at A. A pipe-section, B, is bolted to the side of the casing A, over the opening thereof, said section having a circular flange, *a*, through which pass the bolts *b* by which said section is securely held in place. This pipe-section has screw-threads upon its exterior to receive a jam-nut or ring, C, which may be provided with holes *c* to receive a wrench or other tool for turning it; or any other well-known means may be employed to turn the nut or ring, as found most convenient. The suction-elbow D is provided at its lower end with a flange, *d*, for attaching thereto the suction-pipe by means of bolts in the usual manner; and the opposite end of the elbow has a similar flange, *e*, for attaching thereto, by bolts or other suitable means, an interior screw-threaded flange, E, the threads thereon engaging with those on the pipe-section B. In attaching this connection to the casing A of the pump, the pipe-section B is first securely bolted to the casing, after which the jam-nut or ring C is screwed on far enough to allow the flange E to engage the threads on the extremity of the section, and then the flange *e* of the suction-elbow is bolted or otherwise fastened to the flange E and adjusted to the position desired. The nut or ring C is now screwed against the flange by means of a lever-wrench or other suitable tool, which holds the suction-elbow in place.

The screw-threads on the pipe-section and the screw-flange on the suction-elbow enables a connection between the two that will admit of the easy and quick adjustment of the elbow without removing any of the bolts or detaching the elbow, and it is held in this adjusted position by the jam-nut or ring C.

Having now fully described my invention, what I claim as new, and desire to secure by Letters Patent, is—

The combination, with the casing of a centrifugal pump and a screw-threaded pipe-section provided with a flange, *a*, connected to the side thereof around or over the opening in the casing by the bolts *b*, of a suction-elbow formed with flange *e*, the interiorly-threaded flange E, secured to the flange *e* and engaging the threads of the pipe-section, and the interiorly-threaded nut or ring C, independent of the flange E and adjustable on the pipe-section and adapted to be jammed against the back of the flange E, substantially as shown and described, and for the purpose specified.

In testimony that I claim the above I have hereunto subscribed my name in the presence of two witnesses.

EDGAR LOUIS STREAM.

Witnesses:
 ANDREW HERO, Jr.,
 EUGENE DOWTY.